July 27, 1926.
S. B. HANSON
1,593,695
COMBINED PILOT LIGHT FOR GAS BURNERS
Filed August 15, 1924
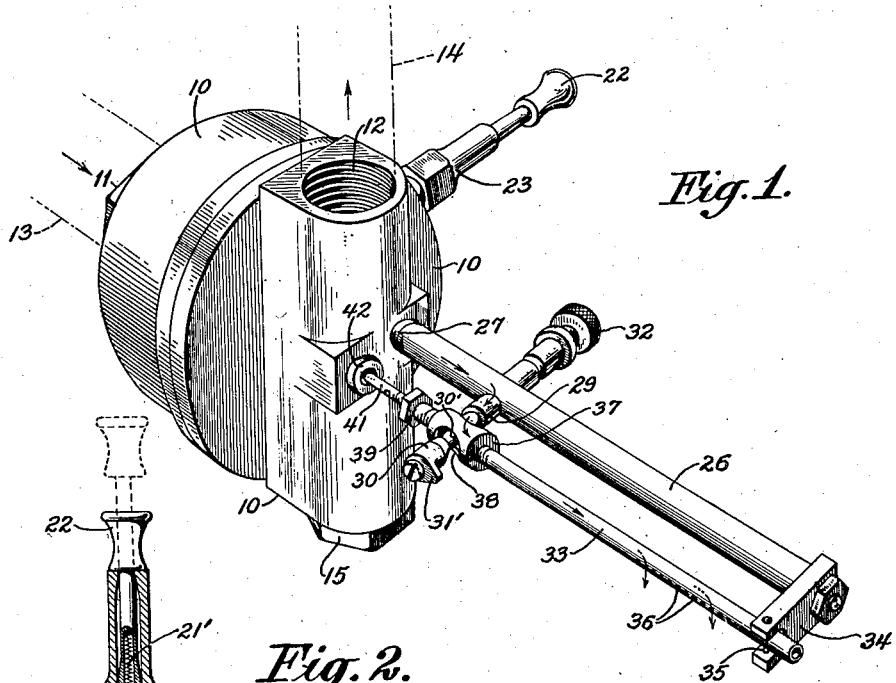
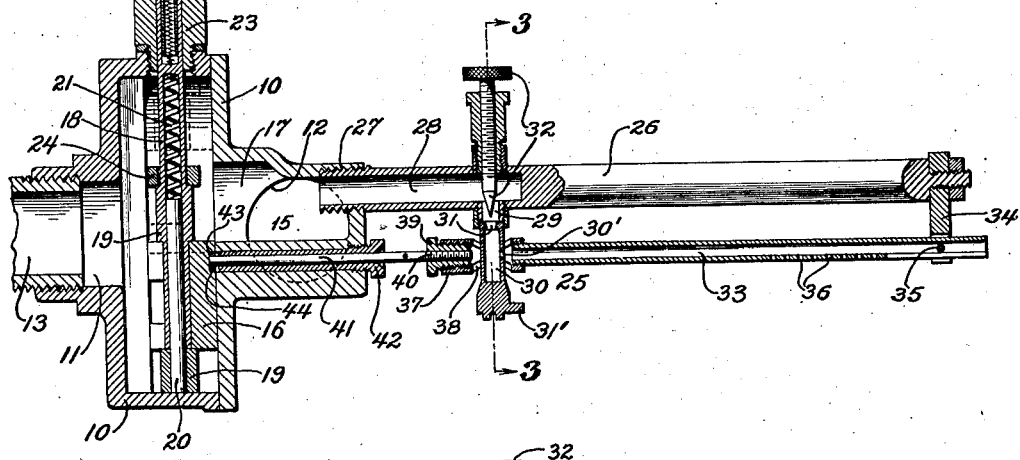
Sverre B. Hanson
INVENTOR
BY Victor J. Evans
ATTORNEY Patented July 27, 1926.

1,593,695

UNITED STATES PATENT OFFICE.

SVERRE BENJAMIN HANSON, OF BAYONNE, NEW JERSEY, ASSIGNOR TO THOMAS A. O'NEIL, OF NEW YORK, N. Y.

COMBINED PILOT LIGHT FOR GAS BURNERS.

Application filed August 15, 1924. Serial No. 732,205.

This invention relates to a combined pilot light for gas burners and has for its principal object the provision of a pilot light burner which acts as a thermostat for holding a valve in an open position as long as the burner is lighted and adapted to permit the valve to automatically close should the pilot light become accidentally extinguished. Heretofore, it has been the practice to heat a thermal rod disposed in the path of the flame of the pilot light and which practice has proven unsatisfactory in certain respects such as causing soot to accummulate about the thermal rod which tends to throw off a poison gas. This soot also acts to insulate the thermal rod thereby preventing the maximum amount of heat from penetrating the rod for expanding the same, and also prevents the rod from quickly cooling when the pilot light is extinguished to facilitate the ready contraction of the rod.

With these and other objects in view, the invention resides in certain novel construction and combination and arrangement of parts, the essential features of which are hereinafter fully described, are particularly pointed out in the appended claims, and are illustrated in the accompanying drawing, in which—

Figure 1 is a perspective view of my invention.

Figure 2 is a horizontal sectional view therethrough and showing the valve in open position in full lines and in closed position in dotted lines.

Figure 3 is a sectional view on the line 3—3 of Figure 2.

Referring more particularly to the drawing, the reference numeral 10 designates a valve casing which may be cast in two pieces and secured together in any suitable manner such as by screws or the like. The casing is provided with an inlet 11 arranged centrally of the axis of the casing, and outlets 12, 12 at right angle to the axis of the inlet. A pipe 13 of a gas supply system is connected with the inlet 11 and a pipe 14 leading to the burner proper is connected with one of the outlets 12, depending on the direction in which the pipe is to be led. The other outlet is closed by a plug 15 as will be seen by reference to Figure 1 of the drawing. Mounted for sliding movement in the casing 10 is a valve head 16 and the same may be mounted upon tracks or the like to prevent lateral movement thereof. The valve head is adapted to close a passage way 17 connecting the inlet 11 and the outlet 12. A hollow plunger rod 18 is employed for actuating said valve head and the same is formed with integral collars 19 for co-action with the ends of the valve head to move the same with the plunger. A pin 20 extends in the free end of the plunger rod and a helical spring 21 serves to force the pin out of the plunger rod and against the side wall of the casing. A second spring 21' is seated against the shank of a manipulating knob 22 which is screwed into the outer end of the plunger rod 18. A gland 23 serves as a bearing for the plunger rod to permit sliding movement thereof, and to seal the casing against leakage. From the description thus far, it will be seen that the spring acting against the pin 20 and the knob 22, will normally hold the valve head in register with the passage way 17 to close the same. A loose washer 24 is provided on the rod and co-acts with the side wall of the casing to limit the backward movement of the valve head.

In order to hold the valve head out of register with the passage way 17 after the plunger rod has been depressed to permit gas to flow to the burner, I provide a thermal device 25 which comprises a support 26 threaded into the casing as at 27. The support is hollow as at 28 for a portion of its length and adjacent the closed end of the support, the same is provided with a boss having an outlet opening 29. A tubular member 30 has its opened end removably secured to said boss and is formed with a beveled seat 31 for co-action by a valve 32 rotatably mounted in the support 26. This valve stem is adapted to control or regulate the flow of gas through the outlet 29 which leads to a pilot burner now to be described. The pilot light burner tube 33 is supported from the support 26 by means of a bracket 34 and is secured or fixed thereto against movement by a pin 35. The outer end of the burner tube is provided with the usual flame openings 36, it being understood that the burner tube is disposed adjacent the burner proper to which the pilot light is to be applied. The inner end of the burner tube has removably secured thereto, a sleeve 37 having an opening 38 therein for the passage of the tubular member 30. The other end of the sleeve has screw threaded connection with a nut 39 and which nut co-acts with the threaded end 40 of a rod 41 for permitting longitudinal adjustment of the rod. The rod 41 extends into the casing through a bushing 42 and is adapted to enter a recess 43 in the flat face of the valve head when the valve head is in open position and during the period that the burner tube is lighted. The rod 41 is made preferably of hard steel, and one wall of the recess 43 may be provided with a hard steel insert 44, whereby the possibility of the parts becoming easily worn is reduced. The opening 38 in the sleeve is sufficiently large as to permit the slight longitudinal movement of the parts 33, 37, 39 and 41 and which movement is caused by the expansion of the thermal burner tube when lighted. The tubular member 30 is formed with a small opening 30' adapted to be disposed in axial alignment with the bore of the burner tube 33 to permit gas to flow from the hollow portion of the support to the burner. A finger 31' is formed integral with the closed end of the tubular member for indicating the position of the opening with respect to the burner tube. The opening 38 in addition to permitting expansion and contraction of the parts also permits atmospheric air to mix with the gas entering the burner tube to provide the necessary mixture for ignition purposes.

In operation, the valve head 16 is moved to its open position by pressing the plunger rod 18 inwardly against the tension of the springs 21 and 21', to permit gas to flow from the inlet ports to the outlet, to the burner proper and to the pilot burner tube 33. When in open position, the recess 43 is disposed in axial alignment with the rod 41 and after which the pilot burner tube is lighted at the openings 36. When so lighted, the burner tube will expand by reason of the heat, and as the tube is fixed at one end, it will only be possible for the same to move in one direction, and that is toward the valve whereby to cause the pin 41 to enter the recess 43. As long as the flame appears at the openings 36, the valve head will be held in an open position, but should the flame become accidentally extinguished, the tube will contract causing the pin to move out of the recess and at which time the spring 21 will automatically return the valve head to a position to close the passage way 17 thereby shutting off the gas to the burner proper and to the thermal burner tube. It will therefore be seen that the pilot burner tube not only serves as a pilot light but also acts as a thermal element for controlling the action of the valve.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A thermally controlled device for gas valves comprising a valve structure having a movable valve head and intake and outlet ports respectively, controlled by the movement of the valve head, a thermal burner tube fixedly supported at one end from said valve structure and capable of expansion when a flame appears at the thermal burner tube and adapted to contract when the flame is extinguished, a duct connecting said burner tube with said outlet port, a mixing chamber within said burner tube and means attached to the free end of said thermal burner tube and operable thereby upon expansion of the same and in axial alignment therewith for direct locking engagement with said valve head when the same has been moved to open position.

2. A thermally controlled device for gas valves comprising a valve structure having a movable valve head and intake and outlet ports respectively, controlled by the movement of the valve head, a thermal burner tube fixedly supported at one end from said valve structure and capable of expansion when a flame appears at the thermal burner tube and adapted to contract when the flame is extinguished, a duct connecting said burner tube with said outlet port, a mixing chamber within said burner tube, means attached to the free end of said thermal burner tube operable thereby upon expansion of the same and in axial alignment therewith for direct locking engagement with said valve head when the same has been moved to open position, and automatic means for closing said valve head upon the contraction of said thermal burner tube.

3. A thermally controlled device for gas valves comprising a valve structure having a movable valve head and intake and outlet ports respectively, controlled by movement of the valve head, a support having a bore therein and extending from said valve structure, a thermal burner tube fixedly connected at one end with said support and an adjustable rod attached to the free end of said thermal burner tube in axial alignment and movable therewith, a mixing chamber within said thermal burner tube, a tubular member carried by said support and extending through said burner tube and having an opening therein in alignment with said mixing chamber for establishing communication between the bore in said support and the thermal burner tube whereby heat produced by the flame of the thermal burner tube when lighted will cause same to expand to move said rod into direct locking engagement with said valve head.

4. A thermal control device for valves comprising a valve casing having inlet and outlet ports, a valve head for establishing and disestablishing communication between said ports and having a recess therein, means for holding said valve head in a closed position for disestablishing communication between said ports, a member extending from said casing and having a passage therein communicating with the outlet side of said casing, a thermal burner tube fixedly supported from the outer end of said member, a rod slidably mounted in said casing and disposed in axial alignment with said thermal burner tube, an adjustable means connecting the meeting ends of said rod and said thermal burner tube, said means including a sleeve having an opening therein and a nut threaded therewith, a tube depending from said member and passing freely through said opening, said tube having an aperture therein in alignment with the axis of said thermal burner tube, and valve means for controlling the flow of fuel from said passage to said tube when the valve head is held in a position against the action of said means by reason of the expansion of said thermal burner tube when the same is heated to cause said rod to seat within said recess.

In testimony whereof I have affixed my signature.

SVERRE BENJAMIN HANSON.